United States Patent

[11] 3,592,249

| [72] | Inventor | Edward E. Ross<br>San Francisco, Calif. |
|---|---|---|
| [21] | Appl. No. | 815,687 |
| [22] | Filed | Apr. 14, 1969 |
| [45] | Patented | July 13, 1971 |
| [73] | Assignee | Del Monte Corporation<br>San Francisco, Calif. |

[54] CORN-CUTTING MACHINE
3 Claims, 26 Drawing Figs.

| [52] | U.S. Cl. | 146/242, 146/4 |
|---|---|---|
| [51] | Int. Cl. | A23n 15/00 |
| [50] | Field of Search | 146/4, 242; 209/100, 103 |

[56] References Cited
UNITED STATES PATENTS

| 2,787,273 | 4/1957 | Kerr | 146/4 X |
|---|---|---|---|
| 3,463,212 | 8/1969 | Morgan | 209/103 X |
| 3,463,312 | 8/1969 | Barton | 209/103 |

*Primary Examiner*—Willie G. Abercrombie
*Attorney*—Flehr, Hohbach, Test, Albritton & Herbert ABSTRACT: A method and machine for cutting kernels from sweet corn ears. The method employs a rotary cutter together with feed rolls which feed the ears into and through the cutter. A feed conveyor serves to advance the ears in single file and in axial alignment to the feed rolls. Undersized ears and ear fragments, together with upwardly and downwardly tipped ears are dropped through a gap between the feed conveyor and the feed rolls, while ears within the normal range of sizes are fed to the rolls and the rotary cutter means, thereby eliminating jamming.

PATENTED JUL 13 1971
3,592,249
SHEET 1 OF 3
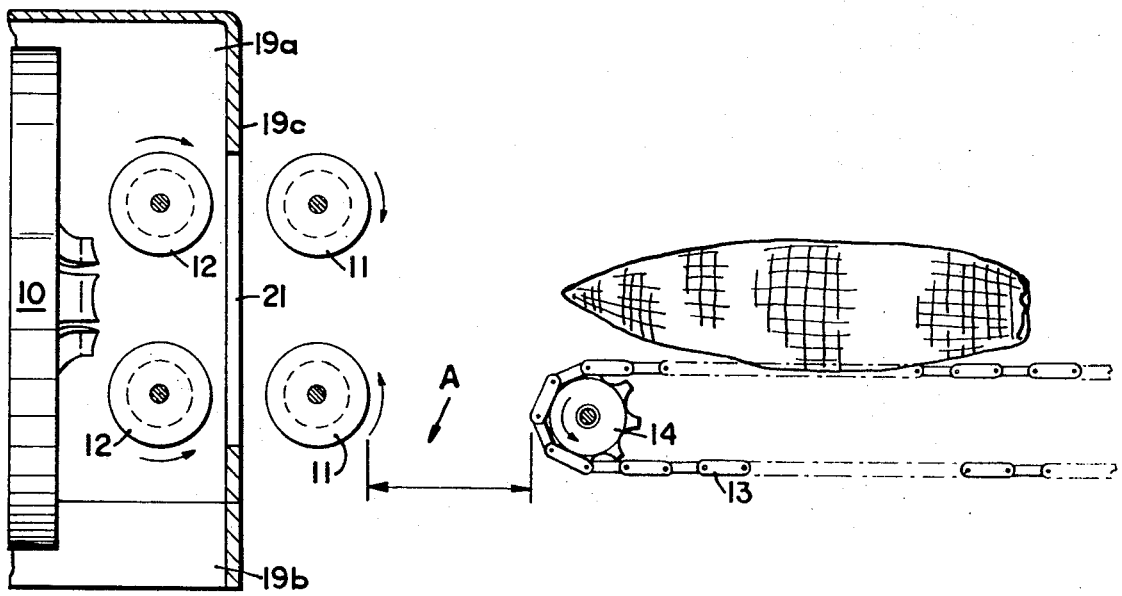
FIG_1
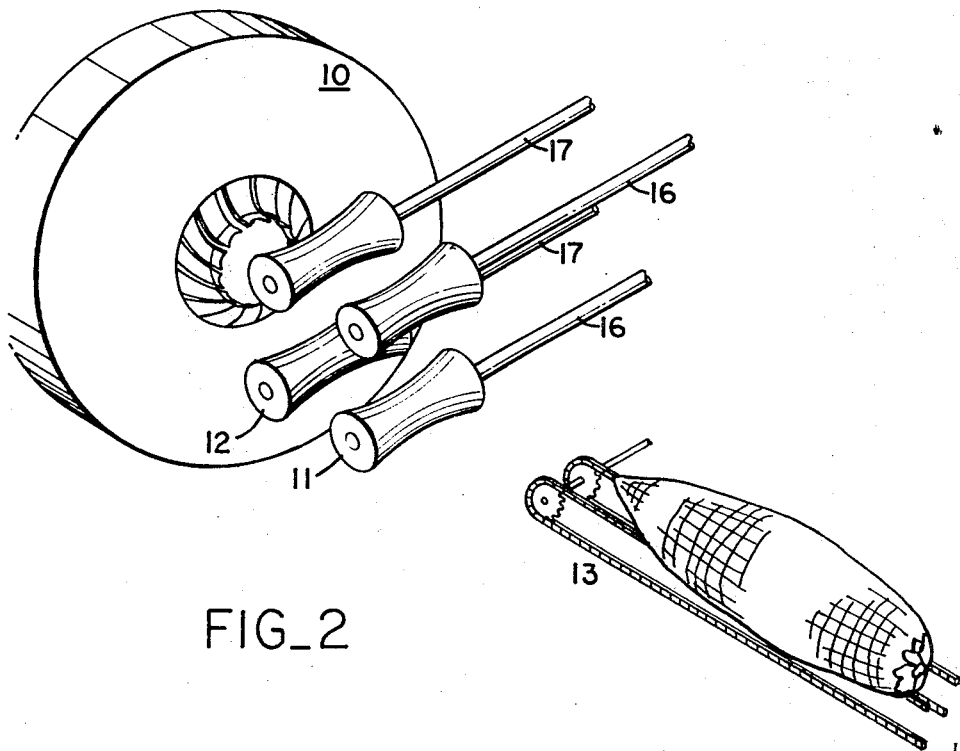
FIG_2
INVENTOR.
EDWARD E. ROSS
BY
Flehr, Hohbach, Test,
Albritton & Herbert
ATTORNEYS

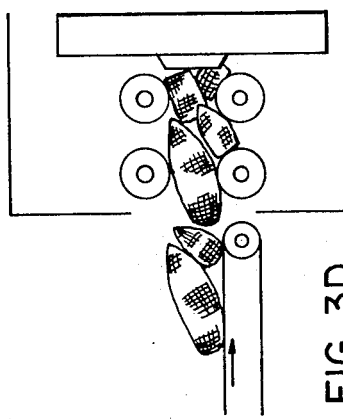
FIG_3D
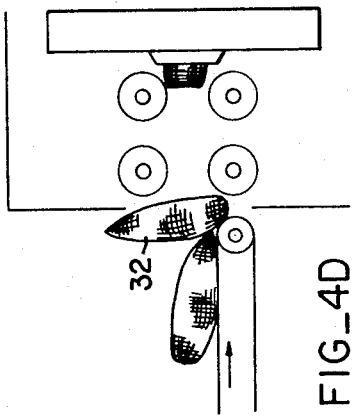
FIG_4D
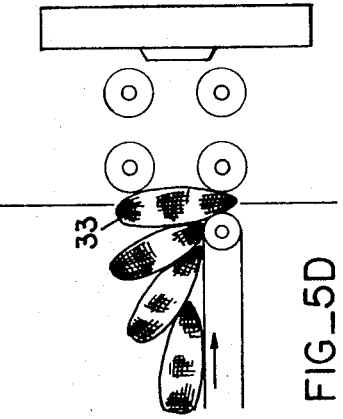
FIG_5D
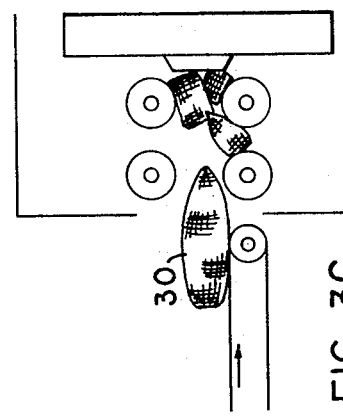
FIG_3C
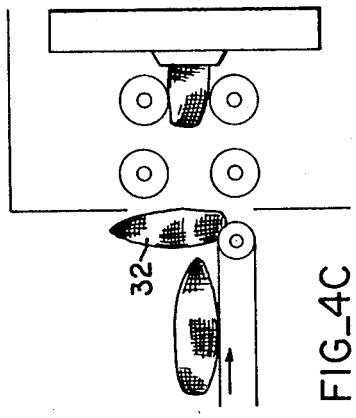
FIG_4C
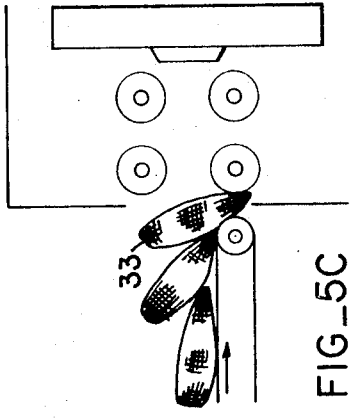
FIG_5C
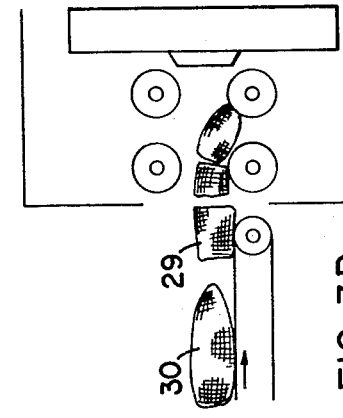
FIG_3B
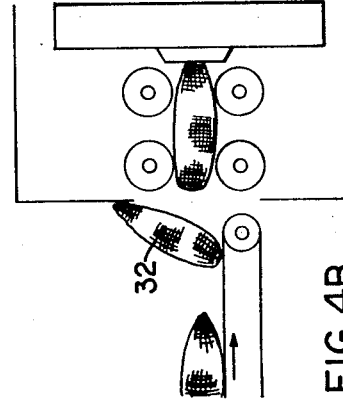
FIG_4B
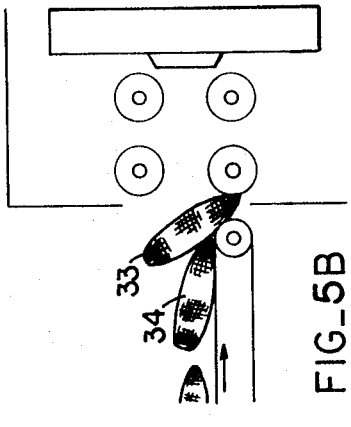
FIG_5B
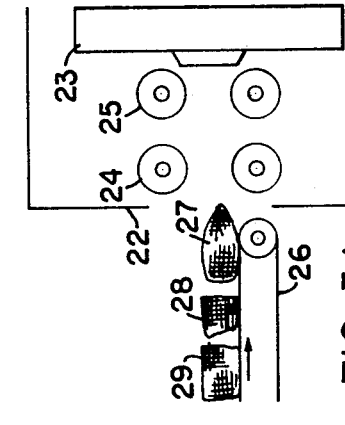
FIG_3A
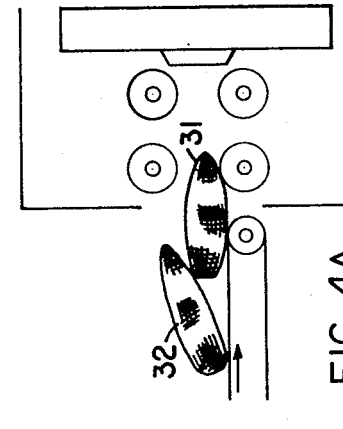
FIG_4A
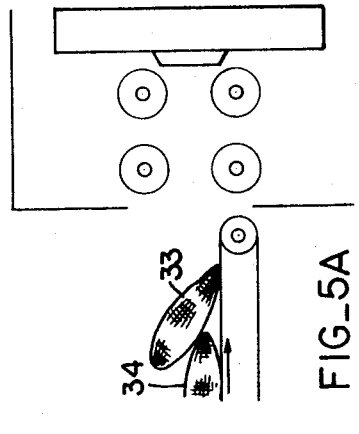
FIG_5A

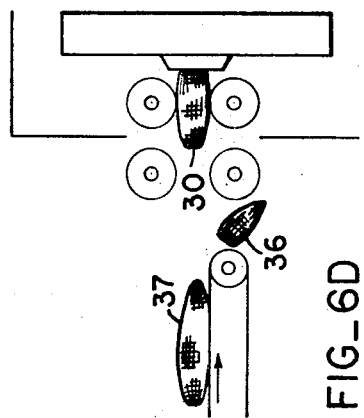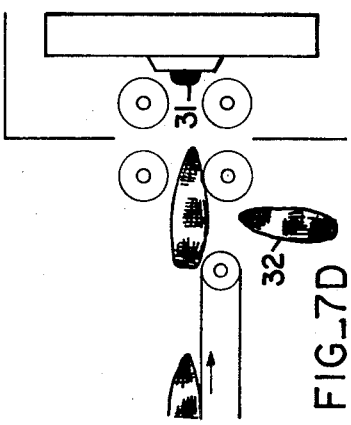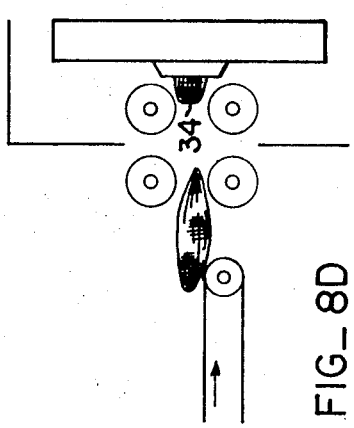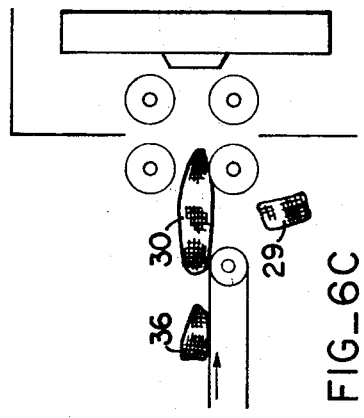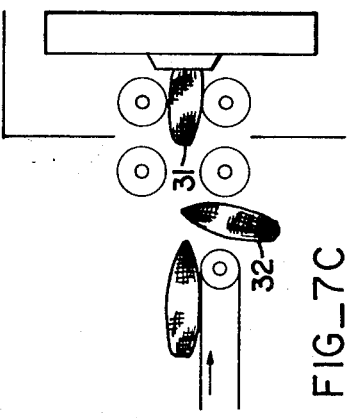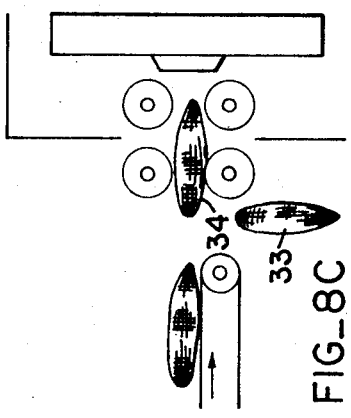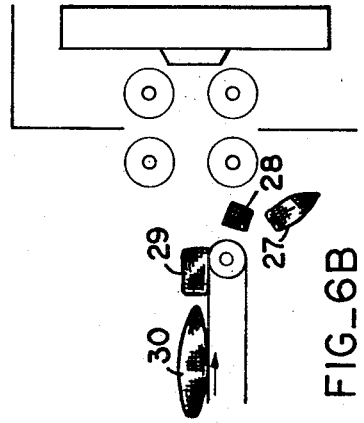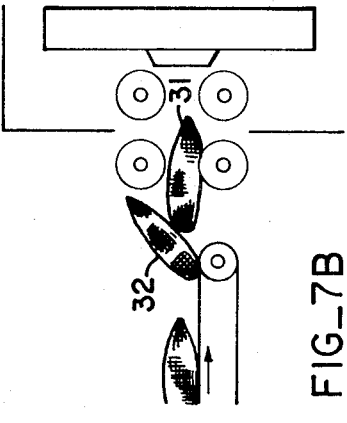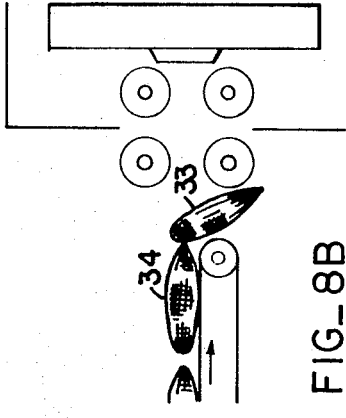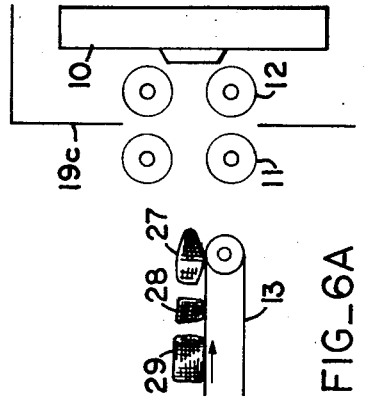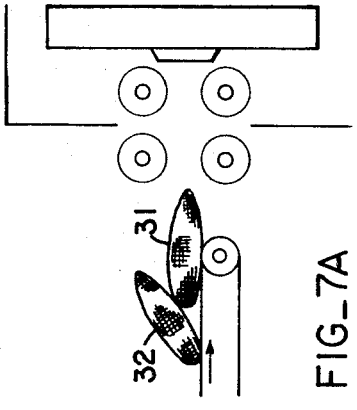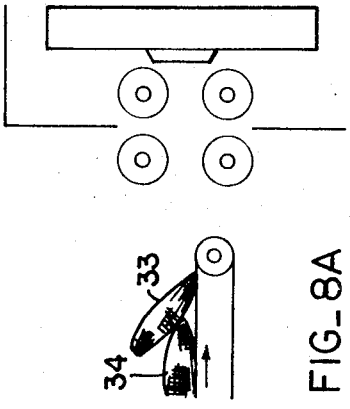

CORN-CUTTING MACHINE

BACKGROUND OF THE INVENTION

Conventional methods and machines for cutting kernels from fresh sweet corn ears have employed rotary cutters together with feed rolls and a feed conveyor which is generally of the double-chain type. A machine of this kind is shown, for example, in Kerr U.S. Pat. No. 2,323,092. For several reasons, such machines are subject to jamming, which requires shutdown of the machine for removing the jammed ears or ear fragments. Historically the operation of supplying ears of corn in single file upon the feed conveyor has been carried out manually. However, it has been recently possible and it is desirable to automate this operation as by use of an orienting machine such as disclosed in Ross U.S. Pat. No. 3,394,805. Such a machine serves to deliver the ears upon the feed conveyor in single file and with the small end foremost. In the construction of such orienting machines it is possible to provide means which serves to reject undersized ears. It has been found that this does not solve the jamming problem, particularly since it does not prevent jamming due to other causes.

One characteristic of conventional corn-cutting machines as described above is the fact that the feed conveyor has its delivery end in close proximity with the first set of feed rolls. With this construction the machine is subject to three principal types of jamming. The first type of jamming is due to the occasional presence of relatively short undersized ears or ear potions, which are of insufficient size to be operatively engaged by the spring-pressed feed rolls for advancement through the cutter. As a result these undersized ears or ear portions become jammed within the region of operation of the feed rolls, with the result that succeeding normal ears are blocked from passing through the rolls. A second type of jam can be referred to as a tip-up jam. This is due to the occasional placing of an ear upon the feed conveyor in such a manner that its pointed end rests upon the butt end of the preceding ear. When the ear reaches the feed rolls its misalignment prevents its small end from entering between the rolls with the result that it lodges across the opening of the feed roll housing and blocks succeeding ears. The third type can be described as a tipped-down jam. In this instance an ear is placed upon the feed conveyor in such a manner its butt end rests upon on top of the pointed end of a succeeding ear. When such a tipped-down ear reaches the housing of the feed rolls, its misalignment again prevents proper engagement with the feed rolls, with the result that it likewise lodges in a position to block succeeding ears.

SUMMARY OF THE INVENTION AND OBJECTS

This invention relates generally to methods for cutting kernels from sweet corn ears, and to corn-cutting machines for carrying out such methods.

The present invention is predicated upon the discovery that the three main causes of jamming as previously described, can be prevented by providing an adequate gap between the discharge end of the feed conveyor and the first set of spring-loaded feed rolls. This gap must be greater than the diameter of the ears being handled, but substantially less than the length of ears being processed. It has been found that with such a gap, and with a free dropout space underlying the gap, undersized ears and ear portions which otherwise would block the feed rolls, drop out through the gap before there is an opportunity of causing jamming. I have also found that by relocating the housing wall which normally surrounds the first set of feed rolls, but in conjunction with the gap just described, both the tip-up and tip-down types of jams are prevented.

In view of the foregoing it is an object of the present invention to provide a corn-cutter method and machine which will eliminate the major causes of jamming as described above. A characteristic of the method and machine is the provision of a gap as described above, between the discharge end of the feed conveyor and first set of feed rolls, and also in the elimination of shrouding about the first set of feed rolls. Also the speed of the feed conveyor is adjusted to obtain a desired dropout action while effectively feeding ears to the feed rolls.

Another object of the invention is to provide a method and machine of the above character which can be readily applied to existing types of corn-cutting machines.

Additional objects and features of the invention will appear from the following description in which the preferred embodiment has been set forth in detail in conjunction with the accompanying drawing.

BRIEF DESCRIPTION OF THE DRAWING

FIG. 1 is a side elevation of views schematically illustrating parts of a corn-cutting machine arranged to carry out the present invention.

FIG. 2 is a perspective view likewise schematically illustrating the parts illustrated in FIG. 1.

FIGS. 3A—3D together with FIGS. 4A—4C and 5A—5D, serve to illustrate the three major forms of jamming such as is experienced in the operation of conventional corn-cutting machines.

FIGS. 6A—6D, taken together with FIGS. 7A—7D and FIGS. 8A—8D, illustrate how the three major types of jamming are eliminated with the present invention.

DESCRIPTION OF THE PREFERRED EMBODIMENT

FIG. 1 schematically illustrates parts of a conventional corn-cutting machine including a rotary cutter assembly 10 which serves to cutting kernels from the ears. Such rotary cutting heads are provided with a series of cutting knives which are retractable, and which rotate about the ear as the ear is moved axially through the cutter. In some machines two of such cutting heads are provided, one following the other. In advance of the cutting head there are two sets of feed rolls 11 and 12. The rolls of each set are driven in opposite directions as indicated by arrows, and the rolls of each set are spring loaded toward the axis of the cutter head. The purpose of these rolls is to engage opposite sides of the ears of corn and advance them into and through the rotary cutter head. Similar rolls are provided on the other side of the head for discharging the stripped ears.

In advance of the first set of feed rolls 11, there is a feed conveyor 13 which feeds the corn ears 14 in single file to the feed rolls 11. In practice the feed conveyor 13 generally consists of two endless chains which engaged sprockets 14 and which are spaced to support the ears in the manner illustrated in FIG. 1. Common means is used to drive the feed rolls 11 and 12 in synchronism. The same means may be used to drive the feed conveyor 13 whereby the ears of corn are advanced at a speed consistent with the speed of rotation of the rolls 11 and 12.

While the parts described above and shown in FIG. 1 are incorporated in prior machines of the type shown in Kerr U.S. Pat. No. 2,323,092, the arrangement differs from prior machines in certain aspects. Particularly there is a substantial gap A between the periphery of the feed rolls 11 and the discharge end of the feed conveyor 13. The gap length $a$ is substantially greater than the diameter of the ears being handled, but it is substantially less than the length of the ears.

FIG. 2 illustrates the same machine parts and the same relationship as shown in FIG. 1. This FIGURE illustrates the configuration of the rolls 11 and 12, particularly in that they have concave peripheral surfaces for engaging the ears. These surfaces may be provided with ribs, grooves, or studs to more effectively engage the ears. The feed rolls are also shown fixed to the ends of shafts 16 and 17, which may be carried, driven, and spring loaded in the manner shown in Kerr U.S. Pat. No. 2,323,092.

In actual practice where ears being processed range from 4 to 12 inches in length and from 1 to 2¾ inches in diameter, the gap A can be of the order of 3 to 3½ inches in length.

In addition to the provision of gap A the shrouding about the first set of feed rolls 11 is eliminated whereby the space about these revolving rolls is left unobstructed. Also the space below the gap A is left clear of obstruction to provide a dropout space.

The parts designated 15a and 15b represent portions of the machine housing. It is customary to extend the housing about both of the rolls 11 and 12. However I provide such housing only for the second rolls 12 whereby the front housing wall 15c extends between the two sets of rolls 11 and 12, where it is provided with an aligned opening 21 through which the ears may pass. This serves to expose the ear-engaging action of the feed rolls 12 more directly to the corn delivery from conveyor 13, and it eliminates parts against which ears may jam.

Referring now to FIG. 3A—3D, the machine parts schematically illustrated are arranged in accordance with conventional practice, with the portion 22 of the machine housing extending between the first set of feed rolls and the discharge end of the feed conveyor. The cutting head is designated 23, the feed rollers 24 and 25, and the feed conveyor 26. FIG. 3A shows three undersized ears or ear portions 27, 28 and 29 being advanced by the feed conveyor 26 to the first set of feed rolls 24. Shown in FIG. 3B these short ears or portions are being followed by a normal ear 30. FIG. 3B illustrates how the first set of feed rolls engages these short ear portions and advances them toward the second set of feed rolls. However the short pieces become jammed in the vicinity of the second set of feed rolls, with the result that the normal ear 30 becomes jammed in the manner shown in FIG. 3D. Such a jammed condition will prevent further normal ears from being properly engaged and fed through the cutting head.

In FIG. 4A the ears 31 and 32 on the conveyor 26 are normal, the ear 32 has been placed upon the conveyor in such a manner that it is tipped upwardly up on top of the ear 31. Shown in FIG. 4B, when the tipped-up ear engages the housing part 22, it is raised to a vertical position as shown in FIG. 4B, when the tipped-up ear engages the housing part 22, it is raised to a vertical position as shown in FIG. 3, thus blocking the next ear 32 shown in FIG. 4D. This can be referred to as a tip-up jam.

Referring to FIG. 5A, the normal ear 33 has been placed upon the feed conveyor 26 in such a manner that it is tipped downwardly, with its butt end portion resting upon the small end of the succeeding ear 34. As shown in FIG. 5B, when such a tipped-down ear reaches the housing portion 22, it becomes jammed crosswise as shown in FIG. 5B with the result that succeeding ears are jammed in the manner shown in FIGS. 5C and 5D.

FIGS. 6A—6D schematically illustrate the present invention, in contrast with prior practice, and are to be compared with FIGS. 3A—3D. FIG. 6A shows the short ears or ear portions 27, 28 and 29 being advanced by the conveyor 13 toward the first set of rolls 11. Instead of such pieces being passed by the first set of rolls 13 to the vicinity of the second set, they are caused to drop out of the machine through the gap A previously described. This is shown in FIG. 6B. The following normal ear 30 is now free to engage the rolls 11, and proceed through the machine as shown in FIG. 6D. If additional short piece 36 follow the ear 30, they likewise drop through the gap as shown in FIG. 6D, thus preventing any jamming and permitting the next ear 37 to continue into engagement with the feed rolls and the cutting head.

FIGS. 7A—7D correspond generally to FIGS. 4A—4D, and illustrate how the present invention avoids jamming due to a tip-up condition. As shown in FIGS. 7B the tipped-up ear approaches the gap and then drops butt end first through the gap as shown in FIG. 7C. This clears the way for succeeding normal ears.

FIGS. 8A—8D illustrate how the invention avoids the down-tip type of jam. As shown in FIG. 8B the downwardly tipped ear drops through the gap A thus permitting succeeding ears to pass normally through the machine.

In making use of the gap A, it is necessary to select proper driving speeds for the conveyor 13 and the feed rolls 11 and 12. In general, the speeds selected should be such that ears within the size ranges being handled are all propelled across the gap without any tilting action. However these speeds should not be sufficiently great to carry undersized ears or ear portions across the gap. Although conventional speeds can be employed, best results have been secured by operating the feed conveyor and the rollers 11 and 12 at speeds slightly higher than conventional speeds. By way of example, if the average ear to be processed is not less than 4 inches in length and 2¾ inches in diameter, a 3-inch gap is satisfactory with the conveyor chain 13 driven at a speed of 150 feet per minute. If very small ears to be processed having a length of from 3 to 6 inches and a diameter not greater than 2 inches, the gap must be shortened to 2½ inches with the same chain speed of 150 feet per minute. If very large ears are to be processed having a length not less than 4½ inches and not over 3 inches in diameter, the gap is increased to about 3½ inches for the same chain speed.

It will be evident from the foregoing that the present invention eliminates all of the major causes of jamming in corn-cutting machines. Thus manual unjamming operations are eliminated, thus minimizing shutdown time and greatly improving overall efficiency of the machines. The invention also tolerates some occasional malfunctioning of the means employed for placing the ears of corn single file upon the feed conveyor. Thus as previously pointed out if the ears are placed on the feed conveyor in such a manner as to provide tipped-up or tipped-down ears, the present invention will function to avoid jamming of the corn-cutting machine.

I claim:

1. In a method for cutting kernels from corn ears making use of a rotary cutter together with feed rolls which engage opposite sides of the ears and advances them axially to the cutter, together with a feed conveyor which supports and advances the ears in single file and in axial alignment to the feed rolls, the feed rolls receiving ears from the conveyor being free of shrouding and exposed, the steps comprising supporting the ears on the feed conveyor, causing the ears discharging from the feed conveyor to bridge a gap before being engaged by the feed rolls, and causing undersized ears and ear portions and also up-tipped and down-tipped ears to be dropped by gravity through said gap, thereby preventing jamming.

2. A method as in claim 1 in which the speed of movement of the feed conveyor is so selected that the ears within the range of sizes being processed are caused to bridge the gap and undersized ears or ear portions, together with upwardly and downwardly tipped ears, to be dropped through said gap.

3. In a corn-cutting machine for cutting kernels from sweet corn ears, a rotary cutting head, spring-loaded feed rolls adapted to engage opposite sides of the ears and to advance them axially into the cutter, a feed conveyor serving to support ears in single file and in alignment and to advance the ears toward the feed rolls, the discharge end of the feed conveyor being spaced from the adjacent periphery of the nearest feed rolls by a gap greater in length than the diameter of the ears but less than the length of the ears within the size range being processed, said nearest feed rolls being free of shrouding whereby the spaces above, below and in front of the same are unobstructed, said gap together with said unobstructed feed rolls serving to cause undersized ears and ear portions and also tipped up and down ears to drop by gravity through the gap.